(12) United States Patent
Wang

(10) Patent No.: US 10,873,952 B2
(45) Date of Patent: Dec. 22, 2020

(54) LTE RESOURCE ALLOCATION

(71) Applicant: Google LLC, Mountain View, CA (US)

(72) Inventor: Jibing Wang, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/828,373

(22) Filed: Nov. 30, 2017

(65) Prior Publication Data

US 2019/0166603 A1    May 30, 2019

(51) Int. Cl.
| | | |
|---|---|---|
| *H04W 64/00* | (2009.01) | |
| *H04W 72/08* | (2009.01) | |
| *H04B 7/08* | (2006.01) | |
| *H04W 76/15* | (2018.01) | |
| *H04L 5/00* | (2006.01) | |
| *H04B 7/0413* | (2017.01) | |
| *H04W 72/04* | (2009.01) | |

(52) U.S. Cl.
CPC ........ *H04W 72/085* (2013.01); *H04B 7/0868* (2013.01); *H04L 5/0069* (2013.01); *H04W 64/003* (2013.01); *H04W 72/082* (2013.01); *H04W 76/15* (2018.02); *H04B 7/0413* (2013.01); *H04L 5/001* (2013.01); *H04L 5/0098* (2013.01); *H04W 72/042* (2013.01); *H04W 72/048* (2013.01)

(58) Field of Classification Search
CPC . H04W 72/085; H04W 76/15; H04W 64/003; H04W 72/082; H04B 7/0868; H04B 7/0413
See application file for complete search history.

(56) References Cited

U.S. PATENT DOCUMENTS

| | | | | |
|---|---|---|---|---|
| 8,594,038 B2* | 11/2013 | Feng | ..................... | H04L 5/0037 370/329 |
| 8,665,813 B2* | 3/2014 | Golitschek Edler Von Elbwart | ................ | H04L 1/0026 307/329 |
| 8,687,541 B2* | 4/2014 | Lohr | ..................... | H04L 5/0007 370/318 |
| 8,743,754 B2* | 6/2014 | Jung | ..................... | H04B 7/0413 370/310 |

(Continued)

FOREIGN PATENT DOCUMENTS

| EP | 3297336 A1 | 3/2018 |
|---|---|---|
| JP | 2017005665 A | 1/2017 |

OTHER PUBLICATIONS

International Search Report and Written Opinion for the related Application No. PCT/US2018/042426 dated Oct. 1, 2018.

*Primary Examiner* — Huy D Vu
*Assistant Examiner* — Bailor C. Hsu
(74) *Attorney, Agent, or Firm* — Honigman LLP; Brett A. Krueger

(57) ABSTRACT

A method for allocating available transceiver resources across different component carriers (CC) includes obtaining a carrier aggregation capability that includes a list of available CCs supported by the UE at a current location for simultaneous communication with a carrier aggregation capable network. The method also includes, for each of the available CCs, obtaining an expected key performance indicator (KPI) associated with the corresponding available CC at the current location. The method also includes allocating the available transceiver resources across the available CCs based on the expected KPIs at the current location.

28 Claims, 8 Drawing Sheets

(56) References Cited

U.S. PATENT DOCUMENTS

| | | | | |
|---|---|---|---|---|
| 8,750,227 | B2* | 6/2014 | Lindoff | H04L 5/0098 |
| | | | | 370/329 |
| 8,768,369 | B2* | 7/2014 | Eskicioglu | H04W 72/02 |
| | | | | 455/446 |
| 8,861,408 | B2* | 10/2014 | Damnjanovic | H04L 1/1607 |
| | | | | 370/280 |
| 9,019,850 | B2* | 4/2015 | Chen | H04W 24/10 |
| | | | | 370/252 |
| 9,137,001 | B2* | 9/2015 | Shah | H04L 5/0058 |
| 9,215,686 | B2* | 12/2015 | Kazmi | H04B 17/27 |
| 9,655,125 | B2* | 5/2017 | Gerstenberger | H04W 72/0406 |
| 9,730,258 | B2* | 8/2017 | Davydov | H04L 1/0026 |
| 9,800,363 | B2* | 10/2017 | Xu | H04J 11/005 |
| 9,867,175 | B2* | 1/2018 | Park | H04W 72/1268 |
| 10,004,078 | B2* | 6/2018 | Palm | H04L 5/001 |
| 10,044,486 | B2* | 8/2018 | Kim | H04L 5/001 |
| 10,097,329 | B2* | 10/2018 | Chiang | H04L 1/203 |
| 2013/0003711 | A1* | 1/2013 | Konno | H04L 5/001 |
| | | | | 370/343 |
| 2013/0016690 | A1* | 1/2013 | Jeong | H04W 24/10 |
| | | | | 370/329 |
| 2014/0086266 | A1* | 3/2014 | Strait | H04W 56/00 |
| | | | | 370/503 |
| 2015/0271755 | A1* | 9/2015 | Karri | H04W 52/0229 |
| | | | | 370/252 |
| 2016/0374069 | A1 | 12/2016 | Palm et al. | |
| 2017/0238316 | A1* | 8/2017 | Li | H04W 72/0453 |
| | | | | 370/329 |
| 2017/0331670 | A1 | 11/2017 | Parkvall et al. | |

\* cited by examiner

| Component Carriers 220,220a-n | RANK | SINR (dB) | RSRP (dBm) | CQI |
|---|---|---|---|---|
| $CC_1$ | 3.1 | 30 | -67 | 13 |
| $CC_2$ | 1 | 3 | -95 | 6 |
| ⋮ | ⋮ | ⋮ | ⋮ | ⋮ |
| $CC_n$ | 3 | 25 | -75 | 11 |

Location A — 42.3314° N, 83.0458° W (430) — 400,400a
Location N — 400,400n
450,450a-d

FIG. 4

LTE RESOURCE ALLOCATION

TECHNICAL FIELD

This disclosure relates to allocating resources in a Long-Term Evolution (LTE) network.

BACKGROUND

Long-Term Evolution (LTE) is a standard for wireless communication of high-speed data for mobile phones and data terminals. LTE is based on the Global System for Mobile Communications/Enhanced Data Rates for GSM Evolution (GSM/EDGE) and Universal Mobile Telecommunication System/High Speed Packet Access (UMTS/HSPA) network technologies. LTE is configured to increase the capacity and speed of the telecommunication by using different ratio interfaces in addition to core network improvements. LTE supports scalable carrier bandwidths, from 1.4 MHz to 20 MHz and supports both frequency division duplexing (FDD) and time-division duplexing (TDD).

In LTE networks, a wireless User Equipment (UE) can be allocated a traffic channel and a signaling channel by an evolved Node B (eNB) for exchanging signaling and communications with the eNB. Carrier aggregation allows the eNB to allocate multiple component carriers (CCs) jointly for use by the UE in exchanging higher rate communications with the eNB. Carrier aggregation generally defines a number of servicing cells, one for each component carrier. While the UE may support multiple-input multiple-output (MIMO) operation with two layers or four layers on each CC, the number of radio frequency (RF) and/or baseband resources available to the UE is often limited. Accordingly, the UE is often left with having to blindly decide how the available RF and/or baseband resources will be allocated across at least two CCs and communicate the number of layers for each of the at least two CCs to a serving eNB.

SUMMARY

One aspect of the disclosure provides a method for allocating available transceiver resources across different component carriers (CCs). The method includes obtaining, by data processing hardware of user equipment (UE), a carrier aggregation capability. The carrier aggregation capability includes a list of available CCs supported by the UE at a current location for simultaneous communication with a carrier aggregation capable network. For each of the available CCs, the method also includes obtaining, by the data processing hardware, an expected key performance indicator (KPI) associated with the corresponding available CC at the current location. The method further includes allocating, by the data processing hardware, the available transceiver resources across the available CCs based on the expected KPIs at the current location.

Implementations of the disclosure may include one or more of the following optional features. In some implementations, the expected KPI includes an averaged number of multiple-input multiple-output (MIMO) layers used by the UE during one or more previous connections to the corresponding available CC at the current location. The UE may operate in a non-carrier aggregation mode during each of the one or more previous connections to the corresponding available CC. In these implementations, for each of the available CCs, the method may include obtaining, by the data processing hardware, an expected signal-to-interference-plus-noise ratio (SINR) associated with the corresponding available CC at the current location, determining, by the data processing hardware, whether the SINR associated with the corresponding available CC at the current location satisfies a SINR threshold, and when the SINR threshold is satisfied, the method may include configuring, by the data processing hardware, the UE to operate on the corresponding available CC and support a MIMO antenna configuration.

In some examples, the expected KPI includes one of an averaged number of multiple-input multiple-output (MIMO) layers used by the UE, an expected signal-to-interference-plus-noise ratio (SINR), an expected reference signal received power (RSRP), or an expected channel quality indicator (CQI). Optionally, obtaining the expected KPI may include querying a data source stored on memory hardware of the UE. Here, the data source includes a mapping of the current location to corresponding CCs that the UE previously connected to at the current location while operating in a non-carrier aggregation mode, as well as a mapping of the corresponding CCs to corresponding expected KPI values.

In some configurations, obtaining the expected KPI includes querying a data source stored on a distributed storage system in communication with the UE. In these configurations, the data source includes a mapping of: the current location to corresponding CCs that a pool of historical UEs previously connected to at the current location; and the corresponding CCs to corresponding averaged KPI values. In these configurations, each historical UE may include substantially a same number of available transceiver resources as the UE.

In some implementations, allocating the available transceiver resources to the available CCs includes ordering the available CCs from the available CC associated with the highest expected KPI to the available CC associated with the lowest expected KPI and allocating more transceiver resources to the available CC associated with the highest expected KPI than to the available CC associated with the lowest expected KPI.

In some examples, the available transceiver resources includes a total number of radio frequency (RF) chains of a RF front end of the UE. In this example, the total number of RF chains may include six RF chains. Additionally or alternatively, the available transceiver resources may include available baseband resources associated with multiple-input multiple-output (MIMO) processing and turbo decoding. In some configurations, the current location of the UE includes a physical location of the UE provided by global positioning system (GPS) coordinates and/or global navigation satellite system (GNSS) coordinates.

In some examples, after allocating the available transceiver resources to the available CCs, the method includes transmitting an allocation message from the UE to at least one base station of the carrier aggregation capable network. In these examples, the allocation message indicates the allocation of the available transceiver resources to the available CCs. After transmitting the allocation message to the at least one base station, the method may further include operating, by the data processing hardware, the UE in a carrier aggregation-mode by connecting the UE to each of the available CCs for simultaneous communication with the carrier aggregation capable network via the at least one base station. The UE may support a multiple-input multiple-output (MIMO) antenna configuration on at least one of the CCs. The MIMO antenna configuration supported by the UE on the corresponding CC may include a 2×2 MIMO antenna configuration or a 4×4 MIMO antenna configuration based on the number of transceiver resources allocated to the corresponding CC.

Another aspect of the disclosure provides a user equipment (UE) device. The UE device includes a transceiver, data processing hardware in communication with the transceiver, and memory hardware in communication with the data processing hardware. The memory hardware stores instructions that when executed on the data processing hardware cause the data processing hardware to perform operations. The operations include obtaining a carrier aggregation capability. The carrier aggregation capability includes a list of available CCs supported by the UE at a current location for simultaneous communication with a carrier aggregation capable network. For each of the available CCs, the operations also include obtaining an expected key performance indicator (KPI) associated with the corresponding available CC at the current location. The operations further include allocating the available transceiver resources across the available CCs based on the expected KPIs at the current location.

Implementations of the disclosure may include one or more of the following optional features. In some examples, the expected KPI includes an averaged number of multiple-input multiple-output (MIMO) layers used by the transceiver during one or more previous connections to the corresponding available CC at the current location. The transceiver may operate in a non-carrier aggregation mode during each of the one or more previous connections to the corresponding available CC. In some scenarios, for each of the available CCs, the operations include obtaining an expected signal-to-interference-plus-noise ratio (SINR) associated with the corresponding available CC at the current location, determining whether the SINR associated with the corresponding available CC at the current location satisfies a SINR threshold, and when the SINR threshold is satisfied, the configuring the transceiver to operate on the corresponding available CC and support a MIMO antenna configuration.

In some configurations, the expected KPI includes one of an averaged number of multiple-input multiple-output (MIMO) layers used by the transceiver, an expected signal-to-interference-plus-noise ratio (SINR), an expected reference signal received power (RSRP), or an expected channel quality indicator (CQI). Obtaining the expected KPI may include querying a data source stored on the memory hardware. Here, the data source includes a mapping of: the current location to corresponding CCs that the transceiver previously connected to at the current location while operating in a non-carrier aggregation mode; and the corresponding CCs to corresponding expected KPI values. In another example, obtaining the expected KPI may include querying a data source stored on a distributed storage system in communication with the UE device. In this example, the data source includes a mapping of: the current location to corresponding CCs that a pool of historical UEs previously connected to at the current location; and the corresponding CCs to corresponding averaged KPI values. In some implementations, each historical UE includes substantially a same number of available transceiver resources as the UE device.

Allocating the available transceiver resources to the available CCs may include ordering the available CCs from the available CC associated with the highest expected KPI to the available CC associated with the lowest expected KPI, and allocating more transceiver resources to the available CC associated with the highest expected KPI than to the available CC associated with the lowest expected KPI.

In some examples, the available transceiver resources includes a total number of radio frequency (RF) chains of a RF front end of the transceiver. Here, the total number of RF chains may include six RF chains. Optionally, the available transceiver resources may include available baseband resources associated with multiple-input multiple-output (MIMO) processing and turbo decoding. The current location of the UE device may include a physical location of the UE device provided by global positioning system (GPS) coordinates and/or global navigation satellite system (GNSS) coordinates.

In some implementations, after allocating the available transceiver resources to the available CCs, the operations further include transmitting an allocation message to at least one base station of the carrier aggregation capable network. In these implementations, the allocation message indicates the allocation of the available transceiver resources to the available CCs. After transmitting the allocation message to the at least one base station, the operations may further include operating the transceiver in a carrier aggregation-mode by connecting the transceiver to each of the available CCs for simultaneous communication with the carrier aggregation capable network via the at least one base station. The transceiver may support a multiple-input multiple-output (MIMO) antenna configuration on at least one of the CCs. The MIMO antenna configuration supported by the transceiver on the corresponding CC may include one of a 2×2 MIMO antenna configuration or a 4×4 MIMO antenna configuration based on the number of transceiver resources allocated to the corresponding CC.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is a schematic view of an example data source including a mapping of a current location to corresponding CCs a UE device previously connected to at the current location, and the corresponding CCs to corresponding key performance indicators.

DETAILED DESCRIPTION

Figure 1:
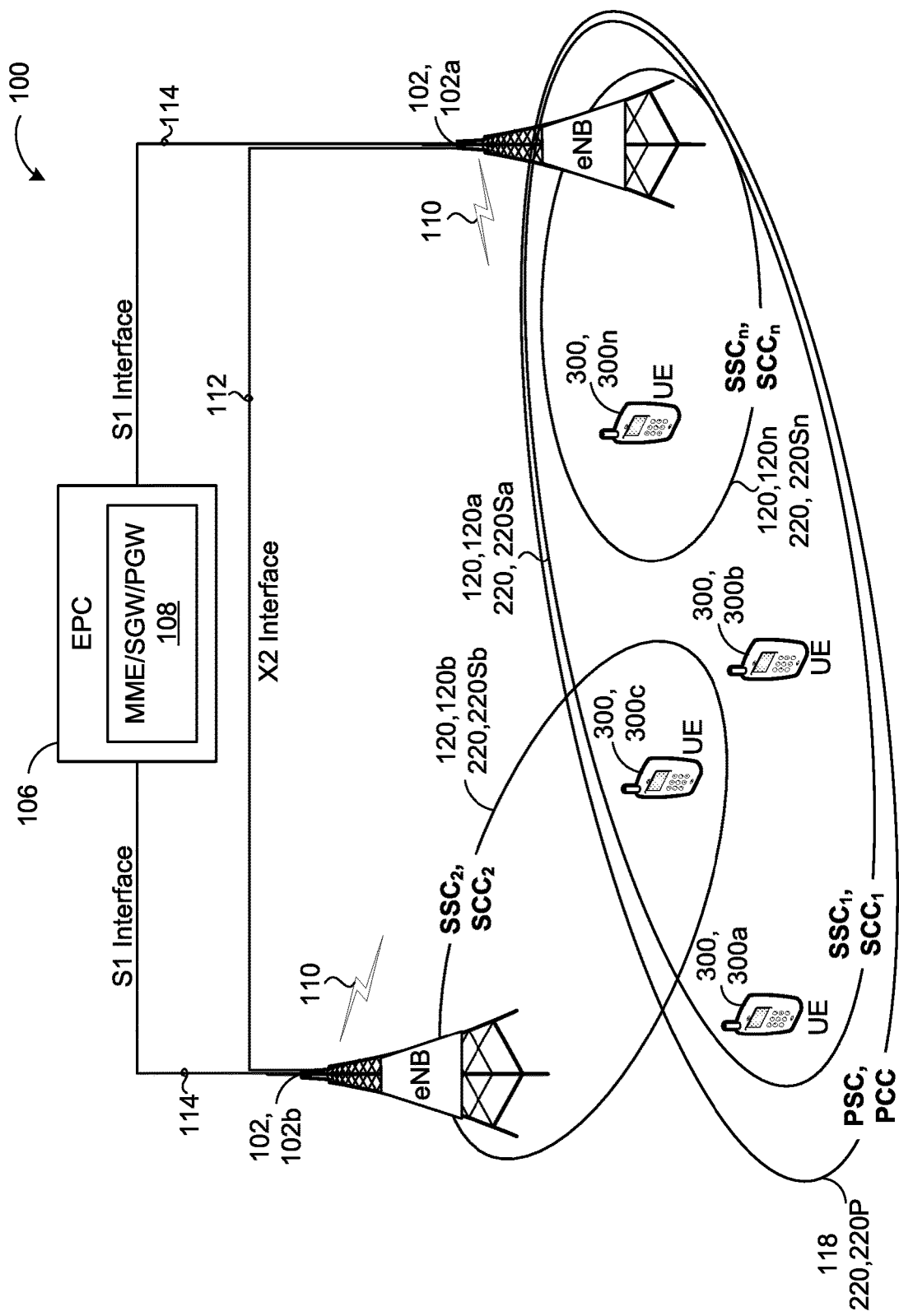
FIG. 1 is a schematic view of an example network.

User equipment (UE) configured to operate over modern radio access technologies (RATs), such as Long-Term Evolution-Advanced (LTE-A), typically support carrier aggregation techniques in which communication between the UE and a network can be conveyed over multiple component carriers (CC) to increase available bandwidth for communication between the UE and the network. Further, the UE may employ an array of multiple antennas for transmitting and/or receiving multiple-input multiple-output (MIMO) communications to and/or from the network. Generally, each antenna of the array is associated with a corresponding radio frequency (RF) chain that includes, without limitation, low noise amplifiers (LNA), down converters, filters, variable gain amplifiers (VGA), analog-to-digital converters (ADC), digital-to-analog converters (DAC), or power amplifiers (PA). The ADC/DAC outputs/inputs are processed by baseband resources of baseband circuitry, whereby each baseband resource may be configured to perform MIMO processing, turbo decoding, and/or other digital signal-processing algorithms for signal reception and recovery. Each RF chain and corresponding baseband resource may be referred to as a 'transceiver resource' and the number of transmitter RF chains and receiver RF chains may provide N×M MIMO antenna configurations where N(≥1) is the number of transmitter RF chains and M (≥2) is the number of receiver RF chains. Due to cost constraints, power-consumption constraints, and/or size constraints of the UE, the number of transceiver recourses available to the UE is generally limited.

Implementations herein are directed toward operating the UE in a carrier aggregation mode, and when feasible, supporting MIMO communications on at least one of the CCs. For example, when the UE supports aggregation of two CCs and is limited to six RF chains, the UE may support a 2×2 MIMO antenna configuration (e.g., two MIMO spatial layers) on the first CC by allocating two of the RF chains to the first CC and support a 4×4 MIMO antenna configuration (e.g., four MIMO spatial layers) on the second CC by allocating the remaining four RF chains to the second CC. However, factors such as line of site and distance between the UE and a serving base station may affect whether or not it is suitable for the UE to support MIMO on one or both of the CCs. For instance, signal strength may be affected when an object or building obstructs a dominant communication path between the UE and the serving base station and/or as the UE moves further away from the serving base station. As a result, blindly allocating the transceiver resources across the CCs available for aggregation may result in one of the CCs not having enough RF chains (<2) when it is optimal for the UE to support a 4×4 MIMO antenna configuration on the corresponding CC. At the same time, another one of the CCs not attaining any benefit of operating in a MIMO antenna configuration may conversely have too many RF chains (>3), thereby leaving some RF chains unused that could have otherwise been allocated to the CC in need of additional RF chains to support the 4×4 MIMO configuration.

In order to optimize how the UE allocates transceiver resources (e.g., RF chains) across multiple CCs available for carrier aggregation, implementations herein include using a current location of the UE to obtain an expected key performance indicator (KPI) associated with each of the available CCs at the current location and allocating the available transceiver resources across the available CCs based on the expected KPIs at the current location. Namely, the expected KPI may include an averaged number of MIMO layers (RANK) associated with each CC at the current location. Additionally or alternatively, the expected KPI may include at least one of an expected signal-to-interference-plus-noise ratio (SINR), an expected reference signal received power (RSRP), or an expected channel quality indicator (CQI) associated with each CC at the current location. Described in greater detail below, the UE may create a CC-KPI log that maps a current location to the KPI for each CC the UE connects to at the current location. Over time, the KPI values for each CC at the current location update to maintain an average/expected KPI for the corresponding CC at the current location. Thus, when RF conditions are favorable for operating in a carrier aggregation mode, the UE may access the log (i.e., stored in memory hardware on the UE) to obtain the expected KPIs associated with the available CCs at the current location, and thereafter, allocate the available transceiver resources across the available CCs based on the expected KPIs at the current location. In doing so, the UE optimizes how the transceiver resources are allocated amongst the available CCs at the current location because CCs associated with rich MIMO operating conditions will receive more transceiver resources and CCs less suitable for MIMO communications will not receive excess transceiver resources.

In these examples, a CC at the current location having an averaged number of MIMO spatial layers that is high (e.g., >3 MIMO layers) may indicate rich MIMO operating conditions. Here, the UE decides to allocate more transceiver resources (e.g., four RF chains) to support a 4×4 MIMO antenna configuration on the CC. However, the averaged number of MIMO layers for the same CC may be low (e.g., <2 MIMO layer) when the UE moves to a new location. For instance, the CC may include a high averaged number of MIMO layers when the UE is located in a parking lot of a grocery market, but after the UE moves from the parking lot to inside the grocery market, the same CC may now be associated with a low averaged number of MIMO layers. Here, the line of site between the UE and serving base station may be obstructed by the walls of the grocery market, thereby diminishing any benefits for supporting the 4×4 MIMO antenna configuration on that CC when the UE is located inside the grocery market.

FIG. 1 shows a Long-Term Evolution (LTE) network 100. LTE is a standard for wireless communication of high-speed data between multiple base stations 102, 102*a-n* and User Equipment (UE) 300, 300*a-n*, such as mobile phones and data terminals. LTE is based on the Global System for Mobile Communications/Enhanced Data Rates for GSM Evolution (GSM/EDGE) and Universal Mobile Telecommunication System/High Speed Packet Access (UMTS/HSPA) network technologies. LTE is configured to increase the capacity and speed of the telecommunication by using different radio interfaces in addition to core network improvements. LTE supports scalable carrier bandwidths, from 1.4 MHz to 20 MHz and supports both frequency division duplexing (FDD) and time-division duplexing (TDD). LTE-TDD networks 100 use a single frequency for uploading and downloading information. LTE-TDD networks 100 operate at frequencies ranging from 1450 MHz to 4300 MHz, with several different bands being used. On the other hand, LTE-FDD networks 100 refer to the transmitting device (e.g., base station 102 and the UE 300 transmitting and/or receiving upon different carrier frequencies.

In some implementations, an Evolved Packet Core (EPC) 106 provides a framework configured to converge voice and data on the LTE network 100. The EPC 106 unifies voice and data on an Internet Protocol (IP) service architecture and voice is treated as just another IP application. The EPC 106 includes several key components 108 that include, without limitations, a Mobility Management Entity (MME), a Serving Gateway (SGW), and a Packet Data Node Gateway (PGW).

The MME is a key control-code for the LTE network 100. The MME manages session and states and authenticates and tracks a UE 300 across the network 100. The SGW is responsible for routing packets through the network 100. The PGW is an interface between the LTE network 100 and other packet data networks, manages quality of service (QoS), and provides deep packet inspection (DPI).

Each base station 102 may include an evolved Node B (also referred as eNode B or eNB). An eNB 102 includes hardware that connects to an air interface 110 (e.g., a mobile phone network) for communicating directly with the UEs 300. For instance, the eNB 102 may transmit downlink LTE signals (e.g., communications) to the UEs 104 and receive uplink LTE signals from the UEs 300 over the air interface 110. The eNB 102 does not have a separate controller element and, thus, simplifies the architecture of the network 100. In addition, the eNB 102 embeds its own control functionality, since the eNB 102 does not include a separate controller element. The eNB 102 uses multiple protocols when interfacing with different elements. For example, the eNB 102 uses an X2-interface 112 when communicating with other eNBs 102 in the network 100 and uses an S1 interface 114 for communicating with the EPC 106. The S1 interface 114 may include an S1-MME interface for communicating with the MME and an S1-U interface for interfacing with the SGW. Accordingly, the S1 interface 114 is associated with a backhaul link for communicating with the EPC 106.

The eNBs 102 may have multiple antennas supporting MIMO technology. The use of MIMO technology enables the eNBs 102 to exploit the spatial domain to support spatial multiplexing, beamforming, and transmit diversity. Spatial multiplexing may be used to transmit different streams of data simultaneously on the same frequency. The data streams may be transmitted to a single UE 300 to increase the data rate or to multiple UEs 300 to increase the overall capacity of the network 100. For instance, an eNB 102 may spatially precode each data stream and then transmits each spatially precoded stream through multiple transmit antennas on the downlink. The spatially precoded data streams arrive at the UE(s) 300 with different spatial signatures, which enables each UE 300 to recover the one or more data streams destined for that UE 300. On the uplink, each UE 300 transmits one or more spatially precoded data streams to enable the eNB 102 to identify the source of each spatially precoded data stream.

UEs 300 may be any telecommunication device that is capable of transmitting and/or receiving voice/data over the network 100. UEs 300 may include, but are not limited to, mobile computing devices, such as laptops, tablets, smart phones, and wearable computing devices (e.g., headsets and/or watches). UEs 300 may also include other computing devices having other form factors, such as computing devices included in desktop computers, vehicles, gaming devices, televisions, or other appliances (e.g., networked home automation devices and home appliances). The UEs 300 may also have antenna arrays 250 of multiple antennas to support MIMO technology (e.g., MIMO antenna configuration).

In some examples, the network 100 corresponds to a carrier aggregation-capable network supporting carrier aggregation where multiple component carriers (CCs) 220 are aggregated and jointly used for transmission to/from a single device (e.g., UE 300). The network 100 may include an LTE-Advanced network under Release 10 (LTE Rel-10) providing higher bitrates while still fulfilling requirements set by existing 4G networks. Under LTE Rel-10, a CC 220 may have a bandwidth of 1.4, 3, 5, 10 or 20 Megahertz (MHz) and a maximum of five CCs 220 may be aggregated to provide a maximum aggregated bandwidth equal to 100 MHz. Future releases, such as LTE Release 13 (LTE Rel-13), may support up to a maximum of thirty-two (32) CCs 220. In FDD-networks 100, the number of aggregated carriers may be different for downlink (DL) communications and uplink (UL) communications. However, the number of UL CCs 220 is always equal to or less than the number of DL CCs 220 and individual CCs 220 can also be of different bandwidths. In TDD-networks 100, the number of CCs 220 as well as the bandwidths of each CC 220 are normally the same for DL and UL communications.

The easiest way to arrange aggregation is through contiguous CCs with the same frequency band, referred to as intra-band contiguous carrier aggregation. However, due to multiple different operator frequency allocation scenarios, intra-band continuous carrier aggregation may not always be possible. Accordingly, non-contiguous allocation may be arranged for one of intra-band or inter-band. Under intra-band non-continuous, the aggregated CCs 220 belong to the same frequency band, but include a gap or gaps in between. Under inter-band non-continuous aggregation, the aggregated CCs 220 belong to different operating frequency bands.

With continued reference to FIG. 1, a number of serving cells 118, 120 are each associated with a corresponding CC 220. The coverage for each serving cell 118, 120 may different due to the CCs 220 on different frequency bands experiencing different pathloss from each other. A Primary CC (PCC) 220P (i.e., DL PCC and UL PCC) serves a Primary serving cell (PSC) 118 configured to handle functionalities of Radio Resource Control (RRC) connection between an eNB 102 and a UE 300, as well as transfer of data 208 (FIG. 2B) between the eNB 102 and the UE 300. The UE 300 may also receive non-access stratum (NAS) information, such as security parameters, on the DLL PCC 220P. The UE 300 may operate in idle mode and listen for system information on the DL PCC 220P and send a physical uplink control channel (PUCCH) to the eNB 102 on the UL PCC 220P. FIG. 1 also shows multiple Secondary CCs (SCCs) 220S, 220Sa-Sn each serving a corresponding Secondary serving cell (SSC) 120, 120a-n for handling the transfer of data 208 (FIG. 2B) between the eNB 102 and the UE 300. The SCCs 220S may be added and removed depending upon current bandwidth needs of the network 100, while the PCC 220P may change at handover.

The plurality of UEs 300, 300a-n each reside within one of the serving cells 118, 120. Here, first and second UEs 300a, 300b may use carrier aggregation on two CCs, i.e., the PCC 220P and the first $SCC_1$ 220Sa, to connect with the first eNB 102a, while at least one additional UE 300n may use carrier aggregation on three CCs, i.e., the PCC 220P, the $SCC_1$ 220Sa, and the $SCC_n$ 220Sn, to connect with the first eNB 102a. In addition to residing within the PSC 118 and the first $SCC_1$ 220Sa provided by the first eNB 102a, a third UE 300*c* also resides within the second SSC$_2$ 120*b* provided by the second eNB 102*b*. Accordingly, the third UE 300*c* may use carrier aggregation on the PCC 220P, the SCC$_1$ 220Sa, and the SCC$_2$ 220Sb to maintain two connections with the first and second eNBs 102*a*, 102*b*.

Figure 2A:
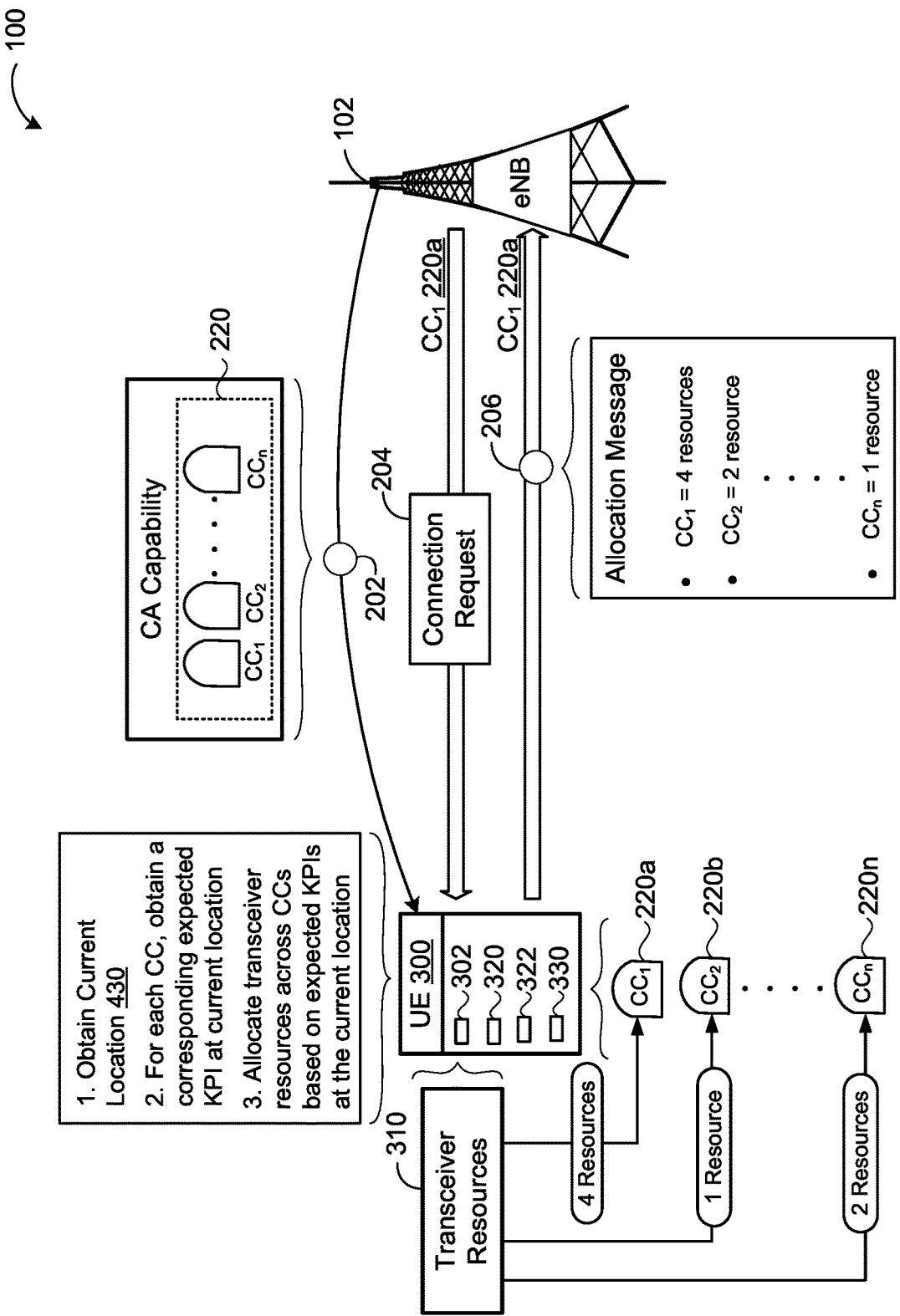
FIG. 2A is a schematic view of example user equipment (UE) allocating transceiver resources to multiple component carriers (CCs) available for carrier aggregation based on an expected key performance indicator at a current location of the UE.
Figure 2B:
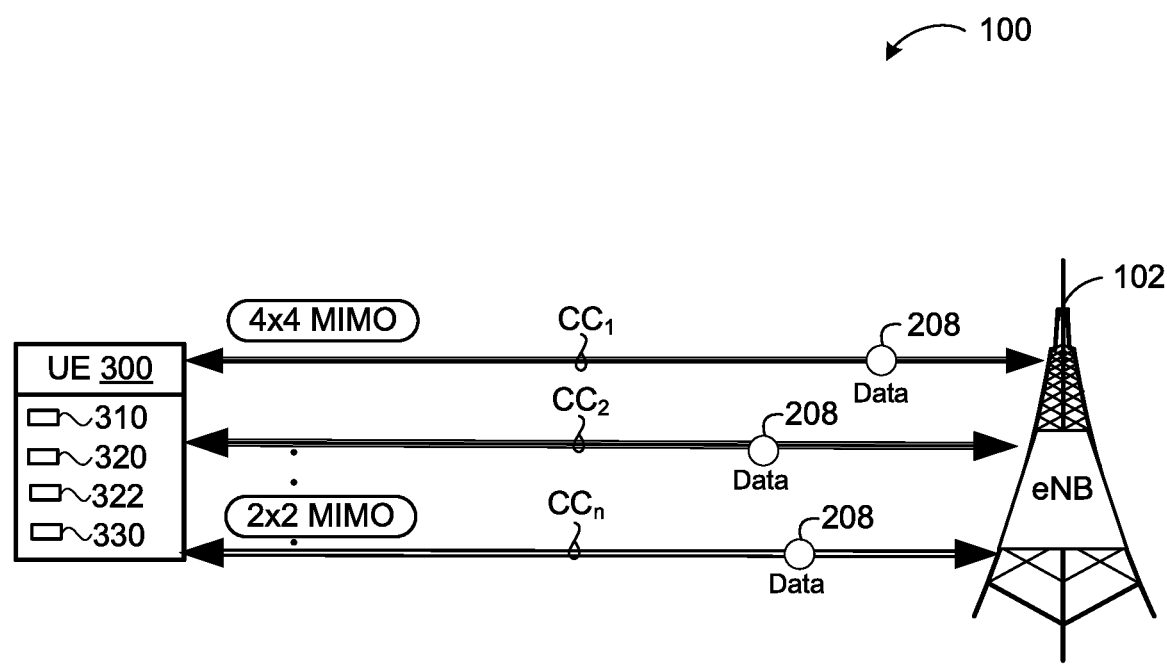
FIG. 2B is a schematic view of example (UE) operating in a carrier aggregation mode and supporting a multiple-input multiple-output antenna configuration on two CCs aggregated for simultaneous communication with a serving base station.

Referring to FIGS. 2A and 2B, in some implementations, a UE 300 operates in a carrier aggregation-mode where multiple component carriers (CCs) 220 available to the UE 300 are aggregated and jointly used for communicating within a carrier aggregation capable network 100 (e.g., LTE-Advanced network). In the example shown, the UE 300 includes a transceiver 302, data processing hardware 320 (e.g., circuitry, silicon chip, etc.) in communication with the transceiver 302, memory hardware 322 in communication with the data processing hardware 320, and a GPS/GNSS module 330 in communication with the data processing hardware 320 and configured to obtain a current location 430 (FIG. 4) of the UE 300. The transceiver 310 includes transceiver resources 310, such as baseband resources 310Ba-n (FIG. 3) and RF chains 310Ra-n (FIG. 3), that may be used to support a MIMO antenna configuration. The memory hardware 322 may store instructions that when executed on the data processing hardware 320 cause the data processing hardware 320 to perform operations for connecting with at least one eNB 102, allocating transceiver resources 312 across available CCs 220 based on the current location 430, and operating in the carrier aggregation-mode by aggregating the available CCs 220 for simultaneous communication with the network 100.

Figure 3:
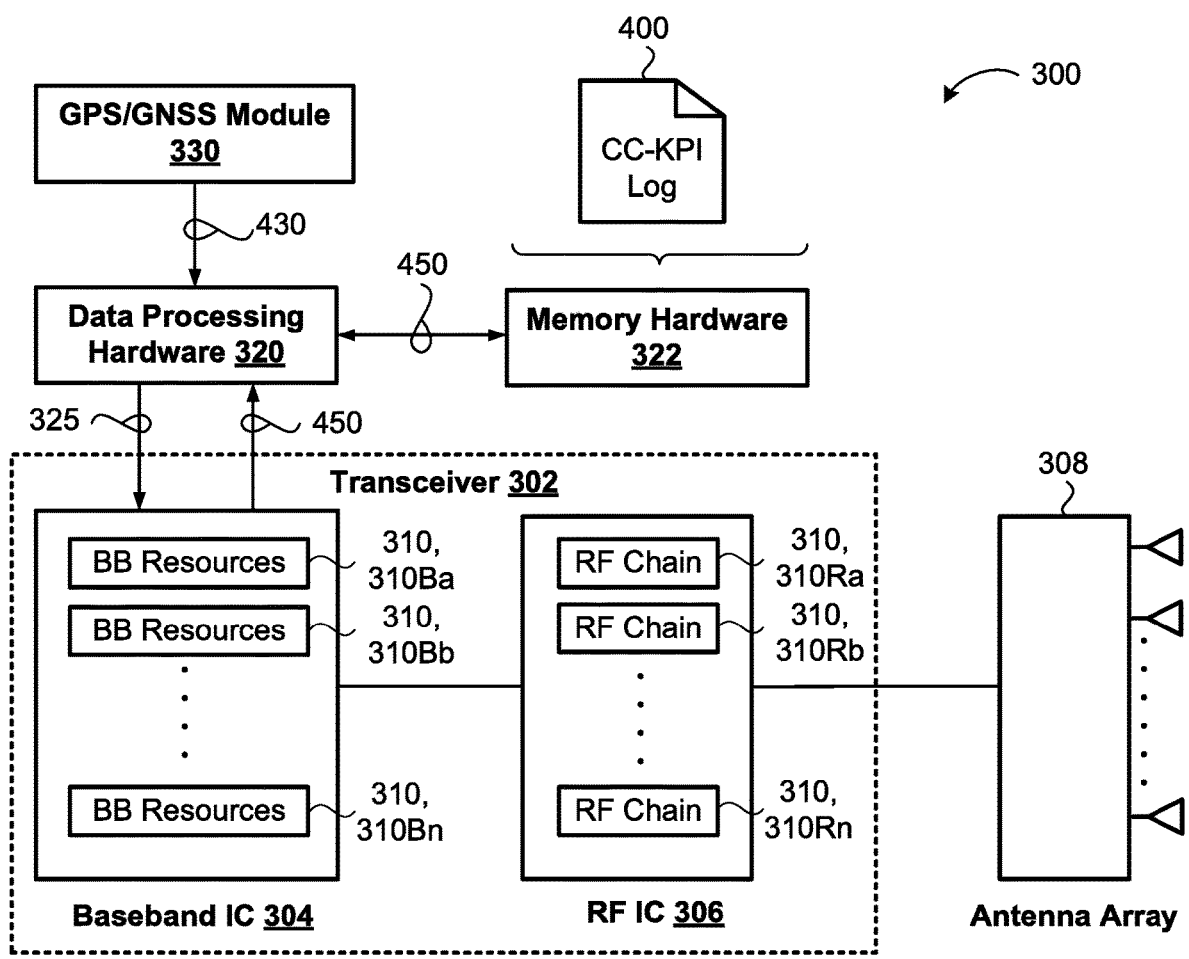
FIG. 3 is a schematic view of example components of an example UE device.

FIG. 3 provides a schematic view of the UE 300 including the transceiver 302, the data processing hardware 320, the memory hardware 322, and the GPS/GNSS module 330. The components may reside on a printed circuit board (PCB) or other substrate. In the example shown, the transceiver 302 includes a baseband integrated circuit (IC) 304 (i.e., control circuitry) in communication with the data processing hardware 320 and a radio frequency integrated circuit (RFIC) 306, i.e., an RF chip, in communication with the baseband IC 304. The RFIC 306 may configure one or more CCs 220 for wirelessly transmitting/receiving of communications thru an antenna array 308 coupled to the RFIC 306. In some examples, the antenna array 308 includes six antennas. In other examples, the antenna array 308 includes four antennas. The antenna array 308, however, is not limited to any set number of antennas and may include less than four antennas or more than four antennas to support N×M antenna configurations.

The baseband IC 304 and the RFIC 306 may include multiple transceiver resources 310 to support carrier aggregation of multiple CCs 220 and/or to support a MIMO antenna configuration on at least one of the CCs 220. In the example shown, the RFIC 306 includes a plurality of RF chains 310, 310Ra-n to support carrier aggregation and/or MIMO antenna configuration(s). Thus, when carrier aggregation is desirable, the UE 300 may use multiple RF chains 310Ra-n concurrently to support aggregation of multiple CCs 220. Each CC 220 may correspond to a separate serving cell 118, 120. In some examples, each CC 220 supported by the UE 300 is also supported by the serving eNB 102, whereby the eNB 102 is capable of supporting multiple co-located serving cells. However, in other examples, one or more CCs 220 supported by the UE 300 are supported by multiple eNBs 102 disposed within the carrier aggregation capable network 100.

Each RF chain 310Ra-n of the RFIC 306 may be associated with a corresponding antenna of the antenna array 308 and include corresponding receiver circuitry (i.e., receiver RF chain) and corresponding transmitter circuitry (i.e., transmitter RF chain) for performing corresponding transmit/receive functions across a corresponding CC 220. The transmit circuitry and receive circuitry may be separate circuitry from one another or the corresponding RF chain may include circuitry that combines the transmit/receive functions. The number of transmitter RF chains and receiver RF chains may provide N×M MIMO antenna configurations where N(≥1) is the number of transmitter RF chains and M (≥2) is the number of receiver RF chains. The receiver circuitry and transmitter circuitry of each RF chain 310Ra-n may include, without limitation, low noise amplifiers (LNA), down converters, filters, variable gain amplifiers (VGA), analog-to-digital converters (ADC), digital-to-analog converters (DAC), or power amplifiers (PA). The ADC/DAC outputs/inputs associated with each RF chain 310Ra-n may be processed by a corresponding baseband resource 310Ba-n of the baseband IC 304. Each baseband resource 310Ba-n may be configured to perform MIMO processing, turbo decoding, and/or other digital signal-processing algorithms for signal reception and recovery. In the example shown, the number of baseband resources 310Ba-n is equal to the number of RF chains 310Ra-n. Accordingly, each transceiver resource 310 may collectively refer to a corresponding baseband resource/RF chain pair or may individually refer to either a corresponding baseband resource or a corresponding RF chain.

When the UE 300 operates in the CA mode by aggregating two or more CCs 220, the UE 300 (e.g., via the data processing hardware 320) must allocate at least one transceiver resource 310 to each aggregated CC 220. Moreover, when the UE 300 will benefit from operating in a MIMO antenna configuration on a given CC 220, the UE 300 (e.g., via the data processing hardware 320) must allocate two or more transceiver resources 310 to that CC 220. In one example, when two CCs 220 are supported by the UE 300 for operation in the CA mode and the UE 300 is limited to a total of six transceiver resources 310, the UE 300 may allocate four of the transceiver resources 310 to one of the CCs 220 to support a 4×4 antenna configuration and allocate the remaining two of the transceiver resources 310 to the other one of the CCs 220 to support a 2×2 antenna configuration. However, depending upon RF operating conditions (e.g., line of site and/or distance between the UE 300 and the serving eNB 102) it may be more beneficial to support the 4×4 antenna configuration on one CC 220 than on the other. Accordingly, in order to optimize how the UE 300 allocates the transceiver resources 310 across the available CCs 220 in the CA mode, the UE 300 allocates a corresponding number of transceiver resources 310 to each CC 220 based on a corresponding expected key performance indicator (KPI) 450 at a current location 430. As used herein, the current location 430 refers to a physical location or geolocation at which the UE 300 is currently located. The current location 430 may include GPS coordinates and/or GNSS coordinates obtained from the GPS/GNSS module 330. The expected KPI 450 may include one of an averaged number of MIMO layers used by the UE 300 (i.e., transceiver 302), an expected signal-to-interference-plus-noise ratio (SINR), an expected reference signal received power (RSRP), or an expected channel quality indicator (CQI). The term 'RANK' may be used to indicate the number of MIMO layers used by the UE 300, and may indicate whether or not MIMO operating conditions on the given CC 220 are rich at the current location. For example, a CC 220 at the current location 430 having an averaged number of MIMO layers (i.e., expected KPI 450) that is greater than three MIMO layers may be a strong indicator that the MIMO operating conditions are rich. On the other hand, the averaged number of MIMO layers for the same CC may be less than two MIMO layers when the UE 300 moves to a new location. For instance, the new location may be further away from the serving eNB 102 and/or the line of site (e.g., dominant communication path) between the UE 300 and the serving eNB 102 is obstructed. Accordingly, supporting a MIMO antenna configuration on the CC at the new location may not provide any benefits in terms of communication speed and throughput, and therefore, the UE 300 may limit the number of transceiver resources 310 allocated to the CC at the new location.

With continued reference to FIG. 3, the memory hardware 322 of the UE 300 may store a data source 400 (e.g., CC-KPI log) that includes a mapping of: the current location 430 to corresponding CCs 220 that the UE 300 (i.e., transceiver 302) previously connected to at the current location 430 while operating in a non-CA mode; and the corresponding CCs 220 to values of corresponding expected KPIs 450. Each time the UE 300 connects to a CC 220 at the current location 430 while operating in the non-CA mode, the UE 300 may map the current location 430 to the corresponding CC 220 and measure one or more of the KPI values for that CC 220 to build the CC-KPI log 400. Multiple CC-KPI logs 400 each associated with a different location may be stored in the memory hardware 322. As the UE 300 is connected to only one CC 220 during operation in the non-CA mode, the UE 300 is using all the available transceiver resources 310 on that CC 220. The CC-KPI log 400 compile average KPI values for the CC 220 at the current location 430 based on the number of times the UE 300 connects to the CC 220 and the corresponding measured KPI values of the CC 220 during each of the connections. For instance, the UE 300 may measure one or more of the number of MIMO spatial layers used by the CC 220 at the current location 430, the SINR of the CC 220 at the current location 430, the RSRP of the CC 220 at the current location 430, and the CQI of the CC 220 at the current location 430. Accordingly, the term 'expected KPI' may refer to a historical average of the corresponding KPI value measured over multiple connections to a corresponding CC 220 at the current location 430. In some examples, a value of SINR exceeding 30 decibels (dB) is indicative of rich MIMO operating conditions on the given CC 220.

FIG. 4 provides example CC-KPI logs 400, 400a-n (e.g., data source) that may be stored in the memory hardware 322 of the UE 300 and/or in a distributed storage system 522 (FIGS. 5A and 5B) in communication with the UE 300. Each CC-KPI log 400a-n is associated with a corresponding location 430 (Location A-Location N) and includes the mapping of CCs (e.g., $CC_1$-$CC_n$) 220, 220a-n to corresponding expected KPIs 450, 450a-d. The location 430 may include GPS coordinates and/or GNSS coordinates (e.g., 42.3314° N, 83.0458° W). In the example shown, the expected KPIs 450a-n for each $CC_1$-$CC_n$ 220 includes an expected RANK 450a (averaged number of MIMO spatial layers), an expected SINR 450b (in dB), an expected RSRP 450c (in decibel-milliwatts (dBw)), and an expected CQI 450d.

Referring to FIG. 2A, the UE 300 obtains a carrier aggregation (CA) capability 202 of the UE 300. The CA capability 202 includes a list of available CCs 220 ($CC_1$-$CC_n$) supported by the UE 300 at the current location 430 for simultaneous communication with the carrier aggregation capable network 100. For instance, the UE 300 may aggregate the available CCs 220 to communicate simultaneously with at least one eNB 102 of the network 100. In the example shown, the UE 300 performs a cell search to identify at least one eNB 102 and the eNB 102 may provide the CA capability 202 to the UE 300 by allocating the list of available CCs 220 to the UE 300 in scenarios when operation by the UE 300 the CA mode are possible/suitable. For instance, the eNB 102 may elect to initiate the CA mode for the UE 300 when a communication load in the UE 300 is high and/or when a traffic level at the eNB 102 is low.

The eNB 102 provides a connection request 204 requesting communication with the UE 300 on a first $CC_1$ 220a. Here, the first $CC_1$ 220a may correspond to a primary CC. In response to receiving the connection request 204 on the first $CC_1$ 220a, the UE 300 connects to the eNB 102 on the first $CC_1$ 220a to establish a connection with the eNB 102. Implementations herein are not limited to purely cellular wireless RATs, but may also apply to non-cellular wireless RATs in which CA techniques can be implemented. For example, any wireless network access point may be substituted for the eNB 102. Moreover, while examples herein are generally applied to LTE/LTE-Advanced RATs, implementations herein can be applied to other present or future-developed RATs supporting carrier aggregation.

Upon obtaining the CA capability 202 of the UE 300, the UE 300 uses the GPS/GNSS module 330 to obtain the current location 430 and then obtains a corresponding expected KPI 450 for each of the available CCs 220 at the current location 430. In some examples, the UE 300 (e.g., data processing hardware 320) obtains the corresponding expected KPI 450 for each available CC 220 at the current location 430 by querying the data source (e.g., CC-KPI log) 400 stored on the memory hardware 322. For instance, the UE 300 may query the appropriate CC-KPI log 400 using the current location 430 and then retrieve the expected KPI 450 recorded/logged for each of the available CCs 220. In the example shown, when the current location 430 is associated with Location A, the UE 300 may obtain the expected KPI 450 by querying the CC-KPI log 400a of FIG. 4 that includes the mapping of the current location 430 (Location A) to the corresponding CCs 220, 220a-n; and the corresponding CCs 220, 220a-n to corresponding expected KPIs 450.

With continued reference to FIG. 2A and FIG. 4, the UE 300 (e.g., data processing hardware 320) allocates the available transceiver resources 310 (e.g., baseband resources 310Ba-n and RF chains 310Ra-n) across the available CCs 220 based on the expected KPIs 450 at the current location 430. In some implementations, the UE 300 orders the available CCs 220 from the available CC associated with the highest expected KPI 450 to the available CC associated with the lowest expected KPI 450. In these implementations, the UE 300 allocates the available transceiver resources 310 by allocating more transceiver resources 310 to the available CC 220 associated with the highest expected KPI 450 than to the available CC associated with the lowest expected KPI 450. In the example shown, the UE 300 allocated four transceiver resources 310 to the first $CC_1$ 220a, one transceiver resource 310 to the second $CC_2$ 220b, and two transceiver resources 310 to the remaining $CC_n$ 220n. For instance, the CC-KPI log 400a of FIG. 4 shows the first $CC_1$ 220a associated with the highest RANK 450a of "3.1 MIMO spatial layers", the highest SINR 450b of "30 db", the highest RSRP 450c of "−67 dBm", and the highest CQI 450d of "13". On the other hand, the second $CC_2$ 220b is associated with the lowest RANK 450a of "1 MIMO spatial layers", the lowest SINR 450b of "3 db", the lowest RSRP 450c of "−95 dBm", and the lowest CQI 450d of "6". The remaining $CC_n$ 220n includes expected KPIs 450a-n in between the first $CC_1$ 220a and the second $CC_2$ 220b.

In some examples, the UE 300 allocates the available transceiver resources 310 by allocating more transceiver resources 310 to the available CC 220 associated with the highest averaged number of MIMO spatial layers (RANK 450a) than to the available CC associated with the lowest averaged number of MIMO spatial layers. In these examples, the UE 300 (e.g., the data processing hardware 320) may determine, for each of the available CCs 220, whether the expected SINR 450b associated with the corresponding CC 220 at the current location 430 satisfies a SINR threshold, and when the SINR threshold is satisfied, the UE 300 may configure the transceiver 302 to operate on the corresponding available CC and support a MIMO antenna configuration. In the example shown, the data processing hardware 320 of the UE 300 configures the transceiver 302 to operate on the first $CC_1$ and support a 4×4 MIMO antenna configuration and configures the transceiver 302 to operate on the remaining $CC_n$ 220n and support a 2×2 MIMO configuration. As only one transceiver resource 310 is allocated to the second $CC_2$ 220b, the transceiver 302 is not configured to support MIMO communications when operating on the second $CC_2$ 220b.

After the UE 300 allocates the available transceiver resources 310 to the available CCs 220, FIG. 2A shows the UE 300 transmitting an allocation message 206 to the at least one eNB 102 of the carrier aggregation capable network 100. Here, the allocation message 206 indicates the allocation of the available transceiver resources 310 to the available CCs 220. The UE 300 may transmit the allocation message 206 over the first $CC_1$ 220a corresponding to the primary CC 220P. The at least one eNB 102 may use the allocation message 206 to identify the transceiver resources 310 allocated to each available CC 220 at the UE 300 and thereafter send instructions to the UE 300 to activate each of the CCs 220 for operation in the CA mode. FIG. 2B shows the UE 300 operating on each of the component carriers $CC_1$-$CC_n$ component carriers (CCs) 220 are aggregated and jointly used for transmission of data 208 between the UE 300 and the eNB 102. FIG. 2B shows the UE 300 supporting a 4×4 MIMO configuration while operating on the first $CC_1$ and supporting the 2×2 MIMO configuration while operating on the remaining CCn. The UE 300 is not configured to support MIMO configurations while operating on the second $CC_2$.

Figure 5A:
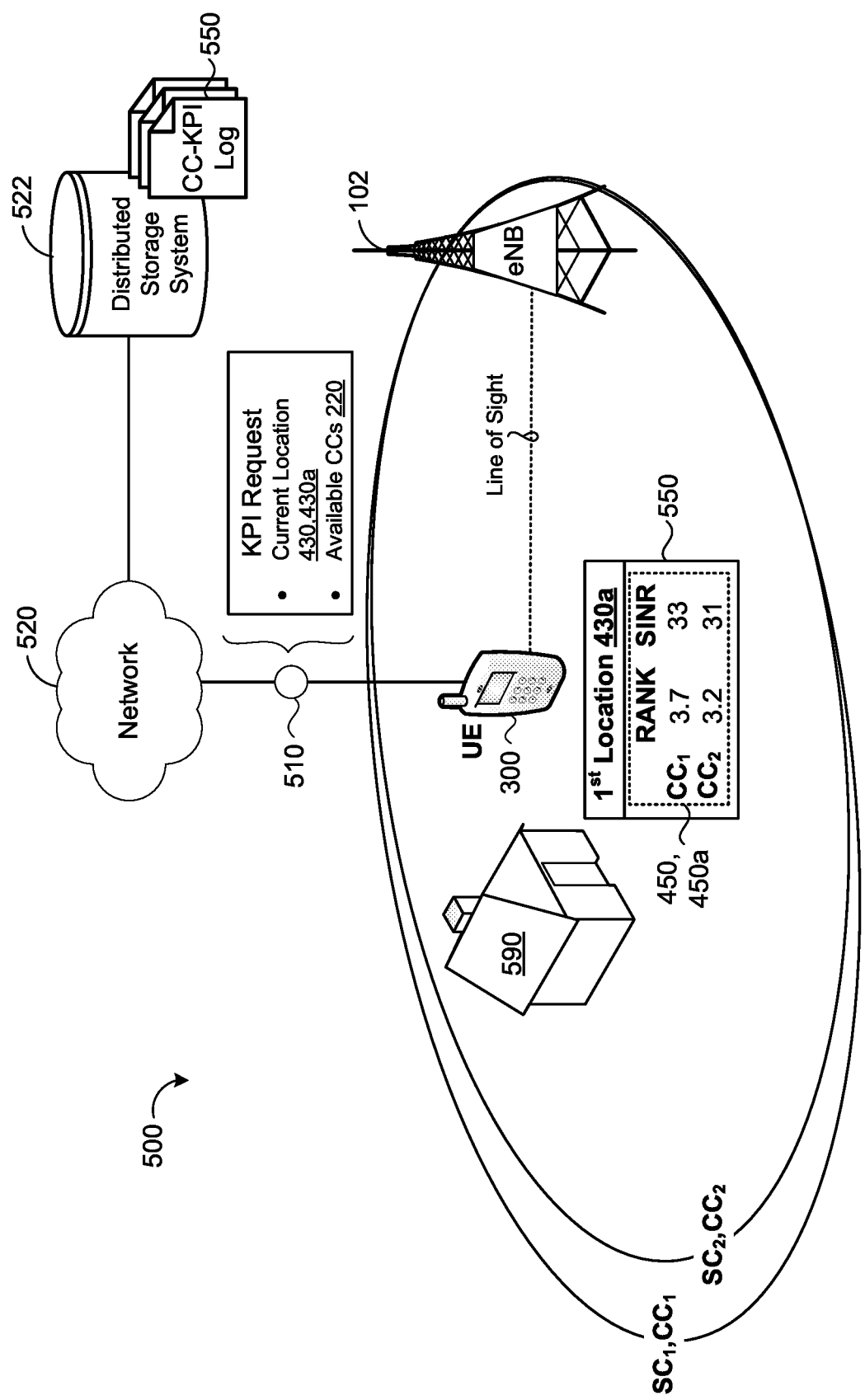
FIGS. 5A and 5B are schematic views of an example UE obtaining key performance indicators associated with first and second component carriers at a current location.
Figure 5B:
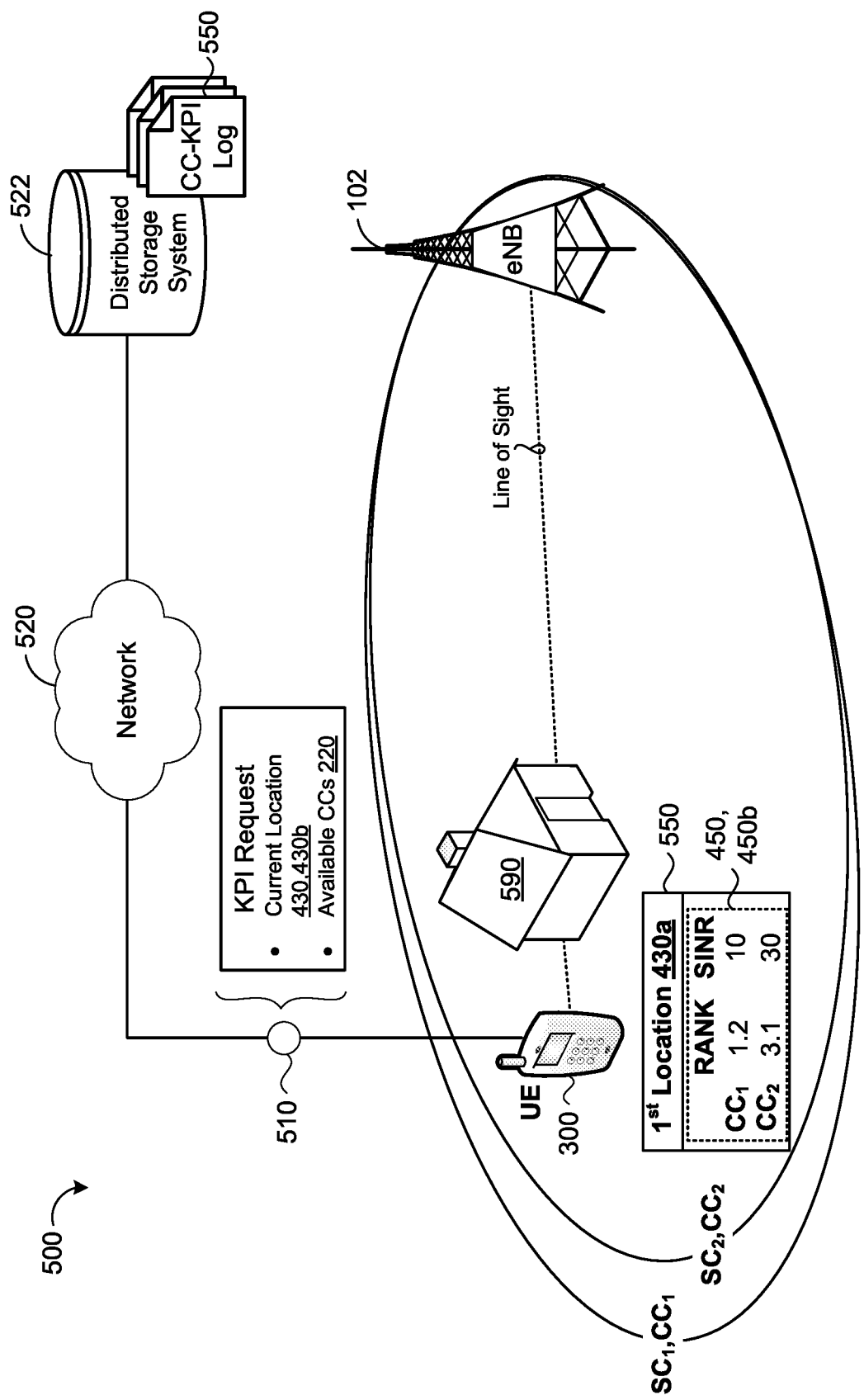

FIGS. 5A and 5B provide an example network environment 500 showing available first and second component carriers $CC_1$, $CC_2$ associated with expected KPIs 450, 450a at a first location 430a (FIG. 5A) that are different than the expected KPIs 450, 450b at a second location 430b (FIG. 5B). In the example shown, the available first and second component carriers $CC_1$, $CC_2$ are supported for carrier aggregation by a UE 300 at the first and second locations 430a, 430b to communicate with a serving base station (e.g., eNB) 102. The eNB 102 provides a first serving cell $SC_1$ associated with operation on the first $CC_1$ and a second serving cell $SC_2$ associated with operation on the second $CC_2$. The first CC1 may include a high frequency band of 1.9 Gigahertz (GHz) while the second $CC_2$ may include a low frequency band ranging from about 700 megahertz (MHz) to about 800 MHz. Generally, high frequency bands are suitable for attaining high throughput so long as a line of site between the UE 300 and the eNB 102 is not obstructed and/or a distance between the UE 300 and the eNB 102 is not too far. For instance, the line of site between the UE 300 and the eNB 102 is not obstructed when the UE 300 is located at the first location 430a, but when the UE 300 moves to the second location 430b, a building 590 disposed between the UE 300 and the eNB 102 obstructs the line of sight therebetween. Low frequency bands, while providing slower data rates than high frequency bands, are capable of serving larger geographical areas and providing frequencies capable of penetrating buildings, structures, or other objects that may otherwise obstruct the line of site between UE 300 and the eNB 102.

In order to decide how to allocate available transceiver resources 310 to the available first and second component carriers $CC_1$, $CC_2$, the UE 300 obtains the expected KPIs 450a, 450b associated with the available first and second component carriers $CC_1$, $CC_2$ at each of the first location 430a and the second location 430b. While the expected KPIs 450 includes KPIs of RANK and SINR in the example shown, the expected KPI 450 can include other expected KPIs 450 in addition to, or in lieu of, the RANK and/or the SINR. In some implementations, the UE 300 obtains the expected KPI 450 by querying a data source (CC-KPI log) 550 stored on a distributed storage system 522 in communication with the UE 300 via a network 520. The UE 300 may query the data source 550 by sending a KPI request message 510 to the distributed storage system 522. The KPI request message 510 may include the current location 430, 430a, 430b and optionally the available CCs 220 (e.g., the first $CC_1$ and the second $CC_2$) at the current location 430 (e.g., either the first location 430a or the second location 430b).

While the CC-KPI log 400 of FIG. 4 is stored locally on memory hardware 322 to include a mapping of CCs the UE 300 previously connected to at the current location, the CC-KPI log 550 includes a mapping of: the current location 430 to corresponding CCs (e.g., $CC_1$ and $CC_2$) 220 that a pool of historical UEs each previously connected to at the current location 430; and the corresponding CCs 220 to corresponding expected/averaged KPI values 450. Each historical UE may include substantially a same number of available transceiver resources as the UE 300. Moreover, each expected/averaged KPI values of the CC-KPI log 550 may be obtained when the historical UEs were operating in a non-CA mode, and therefore, only connected to one CC 220 at a time. Accordingly, the CC-KPI log 550 may provide more robust expected/averaged KPI values 450 compared to the CC-KPI log 400 of FIG. 4 since the CC-KPI log 550 may record KPI values measured by an unlimited number of historical UEs. The UE 300 may additionally or alternative retrieve the CC-KPI log 400 from the memory hardware 322 to obtain the expected KPIs 450 at the first and second locations 430a, 430b without departing from the scope of the present disclosure.

Referring to FIG. 5A, the UE 300 at the first location 430a maintains a clear line of site with the eNB 102 and a distance between the UE 300 and the eNB 102 is shorter when the UE 300 is located at the first location 430a than when the UE 300 is located at the second location 430b (FIG. 5B). Here, the CC-KPI log 550 indicates that the expected KPIs 450, 450a at the first location 430a for the both the first and second component carriers $CC_1$, $CC_2$ are high. For instance, the first $CC_1$ includes a RANK and SINR of 3.7 and 33 dB, respectively, and the second $CC_2$ includes a corresponding RANK and SINR of 3.2 and 31 dB, respectively. Assuming for example that the UE 300 has a total of six transceiver resources 310 available, the UE 300 may allocate four resources to the first $CC_1$ to support a 4×4 MIMO configuration to maximize throughput on the high frequency band and allocate two resources to the $CC_2$ to support a 2×2 MIMO configuration on the low frequency band.

Referring to FIG. 5B, the building 590 now obstructs the line of site (e.g., dominant communication path) between the eNB 102 and the UE 300 at the second location 430b. Moreover, UE 300 is located a further distance away from the eNB 102 when the UE 300 is located at the second location 430b than when the UE 300 was located at the first location 430a (FIG. 5A). Here, the CC-KPI log 550 indicates that the expected KPIs 450, 450b associated with the first component carrier $CC_1$ at the second location 430b have reduced to low values unsuitable for supporting a MIMO antenna configuration on the high frequency band. For instance, due to the building 590 obstructing the line of sight and the eNB 102 being located further away from the UE 300 at the second location 430b, first $CC_1$ including the high frequency band now includes a RANK and SINR of 1.2 and 10 dB, respectively. The RANK and SINR associated with the second $CC_2$ at the second location 430b, however, include substantially unchanged values of 3.1 and 30 dB, respectively, since the low frequency band of the second $CC_2$ is suitable for penetrating the building 590 as well as providing a larger geographical area. Accordingly, the UE 300 may allocate at least four resources to the second $CC_2$ to support the 4×4 MIMO antenna configuration on the low frequency band based on the expected KPIs 450b associated with the second $CC_2$ at the second location 430b. The UE 300 may allocate the remaining resources to the first $CC_1$ to enable operation of the UE 300 in the CA mode, but without allocating excess resources thereto since the corresponding expected KPIs 450b indicate that the UE 300 does not support a MIMO antenna configuration on the second $CC_2$ at the second location 430b. While the examples herein include a UE 300 having a total of six transceiver resources 302, other examples can include UEs having more or less transceiver resources 302 for supporting any N×M MIMO antenna configuration on one or more CCs when multiple CCs are available for carrier aggregation.

Figure 6:
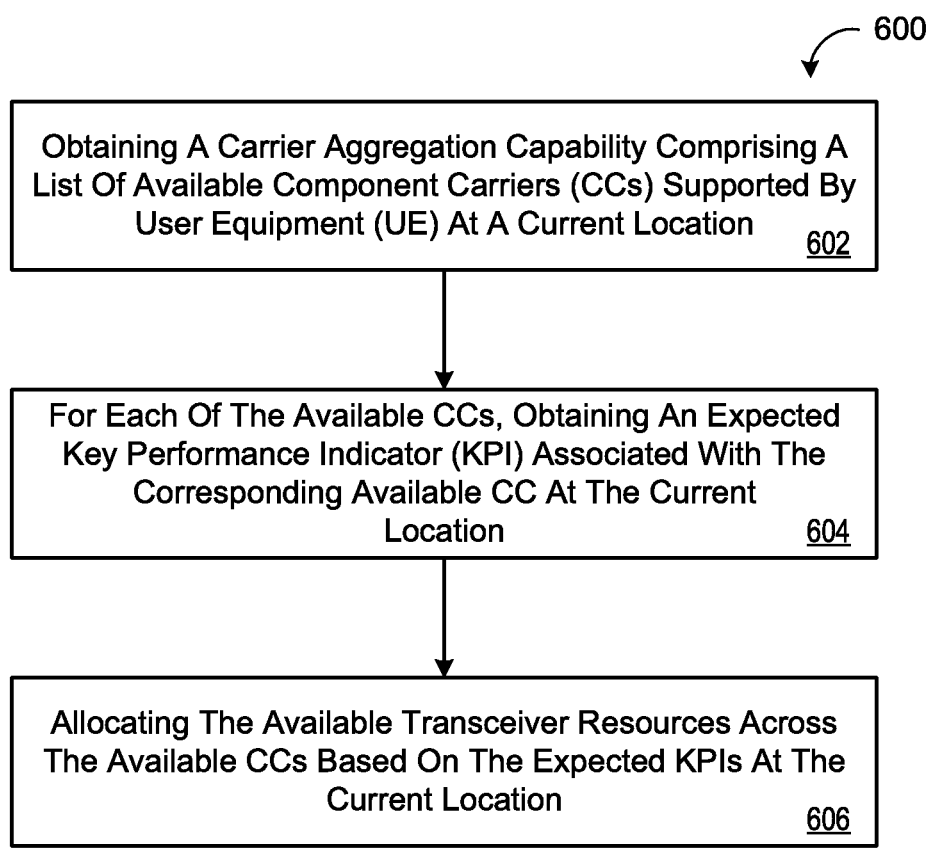
FIG. 6 is a flow chart of an example arrangement of operations for a method of allocating available transceiver resources across different component carriers supported for simultaneous communication with a carrier aggregation capable network.

FIG. 6 provides an example arrangement of operations for a method 600 of allocating available transceiver resources 302 across different component carriers (CCs) 220. At block 602, the method 600 includes obtaining, by data processing hardware 320 of user equipment (UE), a carrier aggregation capability. The carrier aggregation capability includes a list of available CCs 220 supported by the UE at a current location 430 for simultaneous communication with a carrier aggregation capable network 100. For instance, the UE 300 may receive the carrier aggregation capability 202 from a base station (eNB) 102 over a primary CC 220. The aggregated CCs 220 may allow the UE 300 to communicate with the eNB 102 and/or one or more other eNBs 102 of the carrier aggregation capable network 100.

At block 604, for each of the available CCs 220, the method 600 includes obtaining, by the data processing hardware 320, a corresponding expected key performance indicator (KPI) 450 associated with the corresponding available CC 220 at the current location 430. In some examples, the expected KPI includes an averaged number of multiple-input multiple-output (MIMO) spatial layers used by the UE 300 during one or more previous connections to the corresponding available CC 220 at the current location 430. In these examples, the UE operates in a non-carrier aggregation mode during each of the one or more previous connections to the corresponding available CC 220. Here, operation of the UE 300 in the non-carrier aggregation mode indicates that the UE 300 is utilizing all of its transceiver resources on the corresponding CC 220. Additionally, the UE 300 may obtain an expected signal-to-interference-plus-noise ratio (SINR) associated with the corresponding available CC 220 at the current location 430 and determine whether the expected SINR associated the corresponding available CC at the current location satisfies a SINR threshold. When the SINR threshold is satisfied, the data processing hardware 320 of the UE 300 may configure a transceiver 302 of the UE 300 to operate on the corresponding available CC 220 and support a MIMO antenna configuration. The expected KPI 450 may also include one of the expected SINR, an expected reference signal received power (RSRP), or an expected channel quality indicator (CQI) in other implementations.

The UE 300 may obtain the expected KPI 450 by querying a data source (CC-KPI log) 400 stored on memory hardware 322 of the UE 300, as described above with reference to FIGS. 3 and 4. Additionally or alternatively, the UE may obtain the expected KPI 450 by querying a data source (CC-KPI log) 550 stored on a distributed storage system 522 in communication with the UE 300, as described above with reference to FIGS. 5A and 5B.

At block 606, the method 600 includes allocating, by the data processing hardware 322, the available transceiver resources 310 across the available CCs 220 based on the expected KPIs 450 at the current location 430. For instance, the allocating may include ordering the available CCs 220 from the available CC 220 associated with the highest expected KPI 450 to the available CC 220 associated with the lowest expected KPI 450, and allocating more transceiver resources 310 to the available CC 220 associated with the highest expected KPI 450 than to the available CC 220 associated with the lowest expected KPI 450.

The available transceiver resources 310 may include a total number of radio frequency (RF) chains 310R of a RF front end of the UE 300 and/or available baseband resources 310B associated with multiple-input multiple-output (MIMO) processing and turbo decoding. Further, the current location 430 of the UE 300 may include a physical location of the UE 300 provided by global positioning system (GPS) coordinates and/or global navigation satellite system (GNSS) coordinates. After allocating the transceiver resources 310, the UE 300 may further transmit an allocation message 206 to at least one base station 102 of the carrier aggregation capable network 100 that indicates the allocation of the available transceiver resources 310 to the available CCs 220. In response to receiving the allocation message 206, the base station 102 may configure the UE 300 to operate in a carrier aggregation-mode by connecting the UE 300 to each of the available CCs 220 for simultaneous communication with the carrier aggregation capable network 100 via the at least one base station 102. The UE 300 may support a MIMO antenna configuration on at least one of the CCs.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method for allocating available transceiver resources across different component carriers (CCs), the method comprising:

obtaining, by data processing hardware of user equipment (UE), a carrier aggregation capability, the carrier aggregation capability comprising a list of available CCs supported by the UE at a current location of the UE for simultaneous communication with a carrier aggregation capable network, the list of available CCs comprising a primary CC and one or more secondary CCs;

prior to connecting the UE at the current location to the carrier aggregation capable network via any of the available CCs:

for each of the available CCs, obtaining, by the data processing hardware of the UE, an expected key performance indicator (KPI) associated with the corresponding available CC at the current location of the UE, the expected KPI associated with the corresponding available CC at the current location of the UE gathered by one or more respective UEs while operating in a non-carrier aggregation mode, the one or more respective UEs comprising at least one of the UE or one or more other UEs;

allocating, by the data processing hardware of the UE, the available transceiver resources across the available CCs based on the expected KPIs at the current location; and after allocating the available transceiver resources to the available CCs, transmitting an allocation message from the UE to at least one base station of the carrier aggregation capable network over the primary CC, the allocation message transmitted over the primary CC from the UE to the at least one base station indicating a number of the available transceiver resources allocated to each of the available CCs at the current location; and after transmitting the allocation message to the at least one base station, connecting, by the data processing hardware to the UE, the UE to the carrier aggregation capable network via any of the available CCs having transceiver resources allocated thereto to operate the UE in a carrier aggregation-mode for simultaneous communication with the carrier aggregation capable network via the at least one base station.

2. The method of claim 1, wherein the expected KPI comprises an averaged number of multiple-input multiple-output (MIMO) spatial layers used by the UE during one or more previous connections to the corresponding available CC at the current location, the UE operating in the non-carrier aggregation mode during each of the one or more previous connections to the corresponding available CC.

3. The method of claim 2, further comprising, for each of the available CCs:
   obtaining, by the data processing hardware, an expected signal-to-interference-plus-noise ratio (SINR) associated with the corresponding available CC at the current location;
   determining, by the data processing hardware, whether the expected SINR associated with the corresponding available CC at the current location satisfies a SINR threshold; and
   when the SINR threshold is satisfied, configuring, by the data processing hardware, the UE to operate on the corresponding available CC and support a MIMO antenna configuration.

4. The method of claim 1, wherein the expected KPI comprises one of an averaged number of multiple-input multiple-output (MIMO) spatial layers used by the UE, an expected signal-to-interference-plus-noise ratio (SINR), an expected reference signal received power (RSRP), or an expected channel quality indicator (CQI).

5. The method of claim 1, wherein obtaining the expected KPI comprises querying a data source stored on memory hardware of the UE, the data source comprising a mapping of:
   the current location to corresponding CCs that the UE previously connected to at the current location while operating in a non-carrier aggregation mode; and
   the corresponding CCs to corresponding expected KPI values.

6. The method of claim 1, wherein obtaining the expected KPI comprises querying a data source stored on a distributed storage system in communication with the UE, the data source comprising a mapping of:
   the current location to corresponding CCs that a pool of historical UEs previously connected to at the current location; and
   the corresponding CCs to corresponding averaged KPI values.

7. The method of claim 6, wherein each historical UE comprises substantially a same number of available transceiver resources as the UE.

8. The method of claim 1, wherein allocating the available transceiver resources to the available CCs comprises:
   ordering the available CCs from the available CC associated with the highest expected KPI to the available CC associated with the lowest expected KPI; and
   allocating more transceiver resources to the available CC associated with the highest expected KPI than to the available CC associated with the lowest expected KPI.

9. The method of claim 1, wherein the available transceiver resources comprises a total number of radio frequency (RF) chains of a RF front end of the UE.

10. The method of claim 9, wherein the total number of RF chains comprises six RF chains.

11. The method of claim 1, wherein the available transceiver resources comprise available baseband resources associated with multiple-input multiple-output (MIMO) processing and turbo decoding.

12. The method of claim 1, wherein the current location of the UE comprises a physical location of the UE provided by global positioning system (GPS) coordinates and/or global navigation satellite system (GNSS) coordinates.

13. The method of claim 1, wherein the UE supports a multiple-input multiple-output (MIMO) antenna configuration on at least one of the CCs when the UE operates in the carrier aggregation-mode.

14. The method of claim 13, wherein the MIMO antenna configuration supported by the UE on the corresponding CC comprises a 2×2 MIMO antenna configuration or a 4×4 MIMO antenna configuration based on the number of transceiver resources allocated to the corresponding CC.

15. A user equipment (UE) device comprising:
   a transceiver having available transceiver resources;
   data processing hardware in communication with the transceiver; and
   memory hardware in communication with the data processing hardware, the memory hardware storing instructions that when executed on the data processing hardware cause the data processing hardware to perform operations comprising:
      obtaining a carrier aggregation capability, the carrier aggregation capability comprising a list of available CCs supported by the UE at a current location of the UE for simultaneous communication with a carrier aggregation capable network, the list of available CCs comprising a primary CC and one or more secondary CCs;
      prior to connecting the transceiver of the UE at the current location to the carrier aggregation capable network via any of the available CCs for simultaneous communication with the carrier aggregation network:
         for each of the available CCs, obtaining an expected key performance indicator (KPI) associated with the corresponding available CC at the current location of the UE, the expected KPI associated with the corresponding available CC at the current location of the UE gathered by one or more respective UEs while operating in a non-carrier aggregation mode, the one or more respective UEs comprising at least one of the UE or one or more other UEs;
         allocating the available transceiver resources across the available CCs based on the expected KPIs at the current location; and
         after allocating the available transceiver resources across the available CCs, transmitting an allocation message from the UE to at least one base station of the carrier aggregation capable network over the primary CC, the allocation message transmitted over the primary CC from the UE to the at least one base station indicating a number of the available transceiver resources allocated to each of the available CCs at the current location; and
      after transmitting the allocation message to the at least one base station, connecting the transceiver to the carrier aggregation capable network via any of the available CCs having transceiver resources allocated thereto to operate the transceiver in a carrier aggregation-mode for simultaneous communication with the carrier aggregation capable network via the at least one base station.

16. The UE device of claim 15, wherein the expected KPI comprises an averaged number of multiple-input multiple-output (MIMO) spatial layers used by the transceiver during one or more previous connections to the corresponding available CC at the current location, the transceiver operating in the non-carrier aggregation mode during each of the one or more previous connections to the corresponding available CC.

17. The UE device of claim 16, wherein the operations further comprise, for each of the available CCs:
obtaining an expected signal-to-interference-plus-noise ratio (SINR) associated with the corresponding available CC at the current location;
determining whether the expected SINR associated with the corresponding available CC at the current location satisfies a SINR threshold; and
when the SINR threshold is satisfied, configuring the transceiver to operate on the corresponding available CC and support a MIMO antenna configuration.

18. The UE device of claim 15, wherein the expected KPI comprises one of an averaged number of multiple-input multiple-output (MIMO) spatial layers used by the transceiver, an expected signal-to-interference-plus-noise ratio (SINR), an expected reference signal received power (RSRP), or an expected channel quality indicator (CQI).

19. The UE device of claim 15, wherein obtaining the expected KPI comprises querying a data source stored on the memory hardware, the data source comprising a mapping of:
the current location to corresponding CCs that the transceiver previously connected to at the current location while operating in a non-carrier aggregation mode; and
the corresponding CCs to corresponding expected KPI values.

20. The UE device of claim 15, wherein obtaining the expected KPI comprises querying a data source stored on a distributed storage system in communication with the UE device, the data source comprising a mapping of:
the current location to corresponding CCs that a pool of historical UEs previously connected to at the current location; and
the corresponding CCs to corresponding averaged KPI values.

21. The UE device of claim 15, wherein each historical UE comprises substantially a same number of available transceiver resources as the UE device.

22. The UE device of claim 15, wherein allocating the available transceiver resources to the available CCs comprises:
ordering the available CCs from the available CC associated with the highest expected KPI to the available CC associated with the lowest expected KPI; and
allocating more transceiver resources to the available CC associated with the highest expected KPI than to the available CC associated with the lowest expected KPI.

23. The UE device of claim 15, wherein the available transceiver resources comprises a total number of radio frequency (RF) chains of a RF front end of the transceiver.

24. The UE device of claim 23, wherein the total number of RF chains comprises six RF chains.

25. The UE device of claim 15, wherein the available transceiver resources comprise available baseband resources associated with multiple-input multiple-output (MIMO) processing and turbo decoding.

26. The UE device of claim 15, wherein the current location of the UE device comprises a physical location of the UE device provided by global positioning system (GPS) coordinates and/or global navigation satellite system (GNSS) coordinates.

27. The UE device of claim 15, wherein the transceiver supports a multiple-input multiple-output (MIMO) antenna configuration on at least one of the CCs when the transceiver operates in the carrier aggregation-mode.

28. The UE device of claim 27, wherein the MIMO antenna configuration supported by the transceiver on the corresponding CC comprises one of a 2×2 MIMO antenna configuration or a 4×4 MIMO antenna configuration based on the number of transceiver resources allocated to the corresponding CC.

* * * * *